United States Patent Office 2,719,263
Patented Sept. 27, 1955

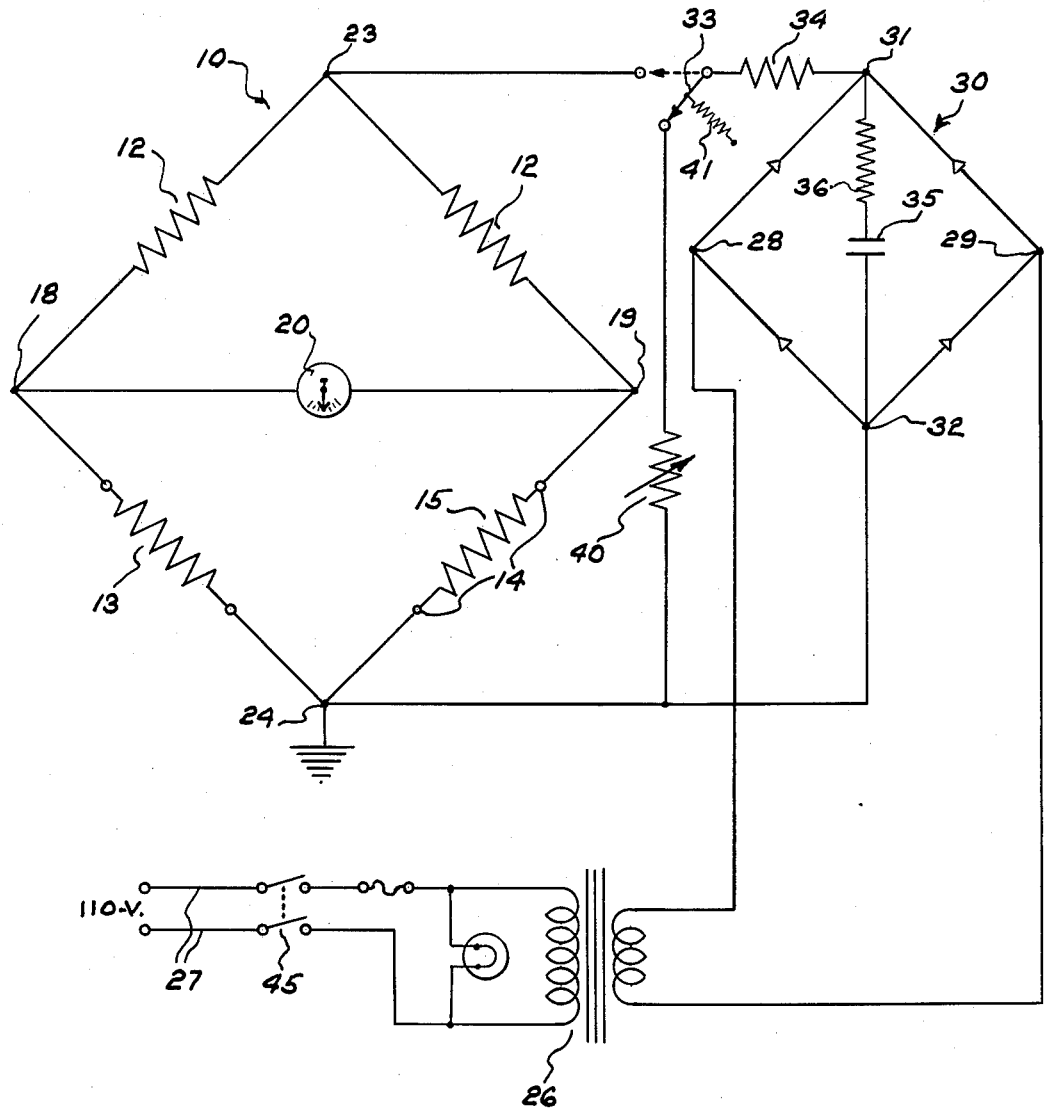
INVENTORS
A.A. FLOWERS
G.A. MITCHELL
BY C.B. Hamilton
ATTORNEY

2,719,263

CURRENT REGULATED BRIDGE CIRCUIT

Alfred A. Flowers, Chicago, Ill., and Gerald A. Mitchell, White Bear Lake, Minn., assignors to Western Electric Company, Incorporated, New York, N. Y., a corporation of New York Application September 21, 1953, Serial No. 381,360

6 Claims. (Cl. 324—62)

This invention relates to bridge circuits for testing the resistance of electrical elements and having a direct reading meter for indicating a range of acceptable elements and more particularly to a bridge circuit having a thermo-responsive current regulator for maintaining a constant current through the bridge circuit and having means for maintaining the current regulator in operative condition during the intervals between tests.

In bridge circuits having a direct reading galvanometer of the zero center type for testing the resistance of electrical elements, it is important that the current supplied to the bridge circuit be constant in order to accurately determine which of the elements being tested come within an acceptable range above or below a predetermined standard. In order to maintain a constant current through the bridge circuit, a current regulator of the thermo-responsive type may be used which has an operating temperature higher than normal room temperature and requires an appreciable length of time to heat up to the correct operating temperature. However, if the current regulator is allowed to cool off after each test, a considerable amount of time is lost in heating the regulator to operating temperature.

It is an object of the present invention to provide an efficient and effective bridge circuit using a current regulator in testing electrical elements with a direct reading meter.

It is a further object of the present invention to provide in bridge testing circuits using thermo-responsive current regulators, means for maintaining the current regulator in an operative condition during intervals between tests.

Other objects and advantages of the invention will become apparent by reference to the following detailed description and the accompanying drawing showing a wiring diagram of the improved bridge circuit for testing electrical elements.

The present testing device is designed to test in relative rapid succession the resistance of a plurality of electrical heating elements for use in magnetrons to determine which of the elements are within acceptable limits.

The testing device comprises a bridge circuit 10 having a pair of identical resistances 12 in two of the arms thereof, a resistance standard 13 of a predetermined value in the third arm thereof, and in the fourth arm a pair of binding posts 14 for connecting therein a heating element 15 of a magnetron which is to be tested. Connected to terminals 18 and 19 of the bridge circuit is a direct reading galvanometer 20 of the zero center type having graduation and limit marks for indicating a predetermined acceptable range of resistance values of the heating elements 15 above and below that of the standard 13.

Power is supplied to the bridge circuit 10 through terminals 23 and 24 thereof from a suitable source including a step-down transformer 26, the primary of which is connected to suitable power lines 27, for example, a 110 v., 60 cycle A. C. power supply. The secondary of the transformer is connected to the input terminals 28, 29 of a selenium rectifier 30 and the output terminals 31, 32 of this rectifier are connected to the bridge circuit 10, the terminal 32 of the rectifier being connected to the terminal 24 of the bridge circuit and the terminal 31 of the rectifier being connected to the terminal 23 of the bridge circuit through a switch 33 and a current regulator 34. The rectifier 30 is provided with a capacitor filter 35 connected across the terminals 31, 32 thereof to filter out the ripple in the D. C. voltage. A resistor 36 connected in series with the capacitor protects the rectifier by limiting the peak charging current to the capacitor.

The current regulator 34 is of a well-known type comprising a metal resistance element sealed in an envelope and having a resistance value which increases and decreases in response to an increase or decrease in the temperature of the element. The current regulator 34, which serves to maintain a substantially uniform current flow in the bridge circuit, has a range of operating temperatures considerably higher than normal room temperature and an appreciable amount of time is required for the current flowing in the circuit to heat the current regulator 34 from room temperature to its operating temperature.

In order to maintain the current regulator 34 at its operating temperature during the intervals between tests, means are provided for passing a current through the regulator during the intervals between tests which means comprises an adjustable resistance 40 connected in series with the switch 33 and the current regulator 34 to the output terminals of the rectifier 30. The resistance 40 is adjusted to a value substantially the same as the resistance of the bridge circuit 10 to the passage of current therethrough.

The switch 33, preferably is of the single pole, double-throw push button type, and is urged by a spring 41 to a normal position shown in full lines in the diagram to disconnect the bridge circuit 10 from the power supply and connect the resistance 40 thereto. In this position of the switch, the current flows through the current regulator 34, thereby maintaining the current regulator at its operating temperature during the intervals between tests. After an untested heating element 15 has been connected in the bridge circuit 10 and it is desired to test it, the switch 33 is moved substantially instantaneously to its second position, as shown in dotted lines in the drawing, thereby disconnecting the resistance 40 from the power supply and connecting the bridge circuit 10 thereto. Inasmuch as the interval is very small between the disconnection of the resistance 40 from the power supply and the connection of the bridge circuit 10 to the power supply, the current regulator 34 does not cool off and is maintained at its operating temperature so that the testing of the heating element 15 may be made without any delay resulting from waiting for the current regulator 34 to heat up to its operating temperature.

On completion of the testing of the heater element 15, the switch 33 is released from the dotted line position and returned substantially instantaneously to its first full line position to disconnect the bridge circuit 10 from the source of power and reconnect the resistance 40 thereto, to maintain the current regulator at its operating temperature. When the testing device is not being used it may be disconnected from the main power supply by the actuation of a switch 45 in the power line 27.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for testing the resistance of electrical elements comprising a bridge circuit, means for connecting an element to be tested in the bridge circuit, a current source for said bridge circuit, a current regulator of the thermo-responsive type having an operating temperature above normal room temperature and requiring a predetermined period of time for the flow of current therethrough to heat it from room temperature to operating temperature, a resistor having a resistance equal to the resistance of the bridge circuit to the passage of current therethrough, and means operable in one position for electrically connecting the bridge circuit, the current source, and the current regulator in series during the testing of said elements and operable in a second position for electrically connecting the resistor, the current source, and the current regulator in series to maintain the current regulator at operating temperature during the intervals between tests.

2. A device for testing the resistance of electrical elements comprising a testing circuit including in series a bridge having means for connecting an element to be tested therein, a current source, and a current regulator of the thermo-responsive type having an operating temperature above normal room temperature and requiring a predetermined period of time for the flow of current therethrough to heat it from room temperature to operating temperature, a heating circuit for maintaining the current regulator at operating temperature when said elements are not being tested including said current source, said current regulator, and a resistor having a resistance equal to the resistance of the bridge circuit to the passage of current therethrough, and means for selectively rendering either one of said circuits operable and substantially simultaneous therewith rendering the other circuit inoperable.

3. A device for testing the resistance of electrical elements comprising a bridge circuit including means for connecting an element to be tested therein, a current source for said bridge circuit including a current regulator of the thermo-responsive type having an operating temperature above normal room temperature and requiring a predetermined period of time for the flow of current therethrough to heat it from room temperature to operating temperature, a resistor having a resistance equal to the resistance of the bridge circuit to the passage of current therethrough, and means including a switch movable to and from first and second positions and operable in said first position to electrically disconnect the bridge circuit from the current source and connect the resistor to said current source to form a heating circuit for maintaining said current regulator at its operative temperature during intervals between tests and operable in said second position to electrically disconnect the resistor from and connect the bridge circuit to the current source to form a testing circuit.

4. The combination set forth in claim 3 wherein said switch is characterized by being movable substantially instantaneously to and from the first and second positions and having means urging it to and yieldably maintaining it in said first position.

5. A device for testing the resistance of electrical elements comprising a bridge circuit, means for connecting an element to be tested into said bridge circuit, a rectifier for supplying current to said bridge, a transformer connectible to a source of power and said rectifier for supplying current to said rectifier, a thermo-responsive current regulator having an operating temperature above normal room temperature and requiring a predetermined length of time for the flow of current therethrough to heat it to said operating temperature, a resistance element having a resistance equal to the resistance to the flow of current through said bridge circuit, and means including a switch operable in one position to connect the current regulator and said resistance element to said rectifier and disconnect the bridge circuit therefrom and operable in a second position to connect the current regulator and the bridge to said rectifier and disconnect said resistance element therefrom.

6. A device for testing the resistance of electrical elements comprising a test circuit including means for connecting thereto an element to be tested, means for supplying a steady current including a current regulator of the thermo-responsive type having an operating temperature above normal room temperature and requiring a predetermined period of time for the flow of current therethrough to heat it from room temperature to operating temperature, a resistor having a resistance equal to the resistance of the test circuit to the passage of current therethrough, and means for alternately connecting said current supplying means to said test set and to said resistor.

References Cited in the file of this patent

UNITED STATES PATENTS

| | | |
|---|---|---|
| 1,695,424 | Harriso | Dec. 18, 1928 |
| 2,623,098 | Durbin et al. | Dec. 23, 1952 |